United States Patent [19]

Fox et al.

[11] Patent Number: 4,538,787
[45] Date of Patent: Sep. 3, 1985

[54] RIGID-FOAM PLASTIC MOLD AND METHOD OF PREPARATION

[76] Inventors: Richard B. Fox, 40 Tri Town Cir., Mashpee, Mass. 02649; James B. Sullivan, 343 Main St., Dennisport, Mass. 02639

[21] Appl. No.: 488,347

[22] Filed: Apr. 25, 1983

[51] Int. Cl.³ .............................................. B29D 27/00
[52] U.S. Cl. .................................... 249/112; 156/245; 156/308.2; 156/309.6; 249/115; 249/117; 249/134; 249/160; 264/45.5; 264/219; 264/321; 264/337; 264/338; 264/DIG. 83; 264/DIG. 66; 425/89; 425/543; 425/817 R
[58] Field of Search ............. 264/337, 225, 321, 45.5, 264/219, 338, DIG. 83, DIG. 66; 249/112, 115, 117, 134, 160; 425/89, 543, 817 R; 156/245, 308.2, 309.6

[56] References Cited

U.S. PATENT DOCUMENTS

| | | | |
|---|---|---|---|
| 2,722,719 | 11/1955 | Altstadter | 264/321 |
| 3,423,488 | 1/1969 | Bowser | 264/337 X |
| 3,490,577 | 1/1970 | Grikscheit | 264/337 X |
| 3,515,779 | 6/1970 | Jones | 264/41 |
| 3,525,783 | 8/1970 | Prikkel, III | 264/225 X |
| 3,544,675 | 12/1970 | Belle Isle | 264/48 X |
| 3,723,584 | 3/1973 | Nussbaum | 264/337 X |
| 3,723,585 | 3/1973 | Nussbaum | 264/337 X |
| 3,789,100 | 1/1974 | Kropscott et al. | 264/337 X |
| 4,055,613 | 10/1977 | Kapral | 264/225 X |
| 4,125,351 | 11/1978 | Alfter et al. | 264/225 X |
| 4,265,850 | 5/1981 | Coulon et al. | 264/337 X |
| 4,419,307 | 12/1983 | Kohara et al. | 264/225 X |

*Primary Examiner*—Philip Anderson
*Attorney, Agent, or Firm*—Richard P. Crowley

[57] ABSTRACT

An inexpensive, cellular plastic mold and method of preparation, wherein the plastic mold comprises male and female mold elements which define a mold cavity therebetween, each of the elements comprising a rigid thermoplastic foam or cellular board material having a smooth, integral, solid layer of a plastic material forming the facing surface of the mold cavity and a relatively thick, solid, supporting layer of a plastic material forming the back surface of the mold elements.

29 Claims, 9 Drawing Figures

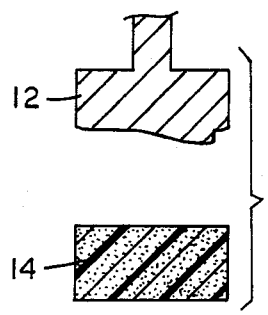 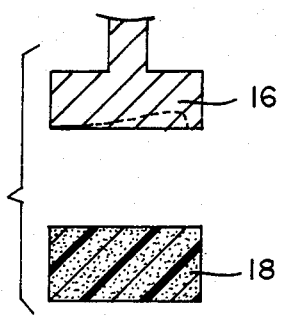
FIG.1    FIG.2
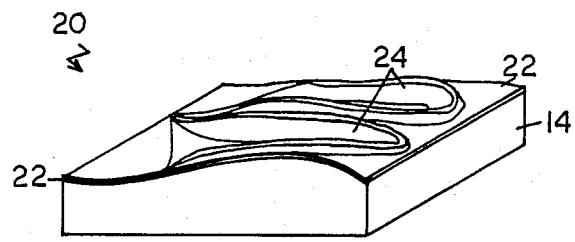
FIG.3
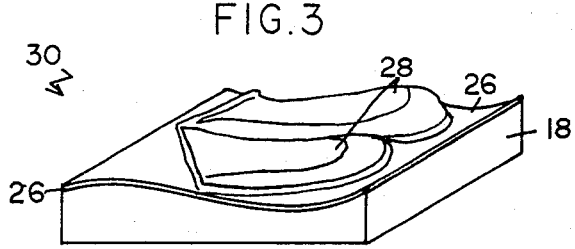
FIG.4
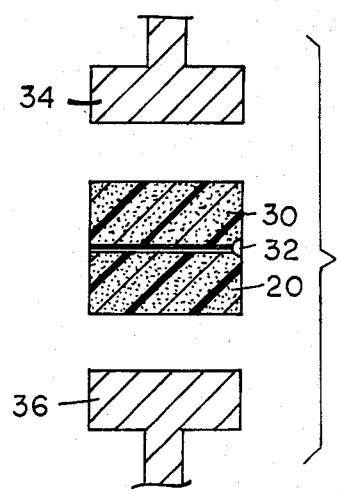
FIG.5
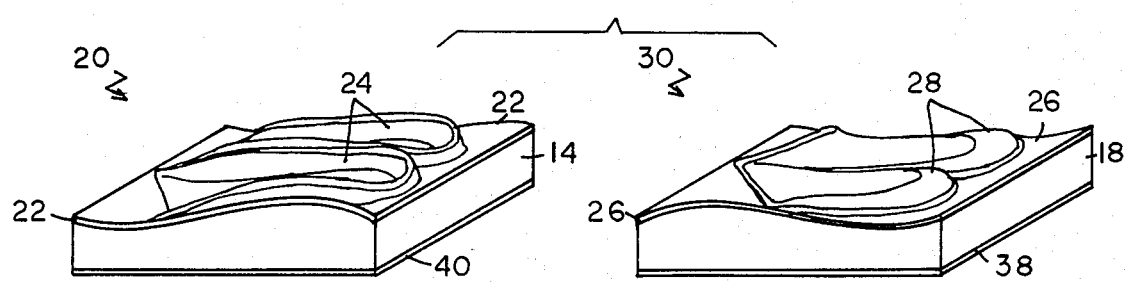
A.    FIG.6    B.

RIGID-FOAM PLASTIC MOLD AND METHOD OF PREPARATION

BACKGROUND OF THE INVENTION

Typically molds, for the molding of polymeric materials, are usually formed from metal or other solid materials and comprise male and female mold sections which, in a closed mold position, define a mold cavity for the molding of a desired object. For example, molds are often employed in the preparation of shoe-innersole materials, and such molds usually comprise male and female sections, wherein a plastic material, such as a urethane resin, employed in the mold is introduced into the mold in an open mold position, and the mold is subsequently closed, prior to full reaction or expansion of the urethane resin, or, if desired, the urethane resin material may be premixed and injected directly into the mold cavity of a closed mold, often known as a reaction injection-molding technique. In such molding process, a polymeric or plastic material is reacted primarily within a mold cavity, often to form foam objects, so that the plastic material in the mold cavity reacts and expands therein and then becomes cross-linked or cured to the desired solid foam. It is desirous to employ and to prepare molds, particularly for use with urethane resins, rapidly and at low cost, and particularly to employ molds wherein the molded object may be released easily from the molded cavity, without the necessity of employing mold-release or other agents which tend to contaminate the surface of the molded objects.

SUMMARY OF THE INVENTION

This invention relates to rigid-foam, plastic molds, to the mold elements forming the plastic mold and to the method of preparing and using such plastic molds. In particular, the invention concerns an inexpensive, rigid-foam or cellular mold formed of a thermoplastic, rigid-foam material and a method of preparing such molds, particularly for use with elastomeric polyurethane molding materials.

An inexpensive, plastic mold element, with male and female and plastic molds prepared therefor, has been discovered, wherein the mold elements may be prepared from inexpensive, rigid, thermoplastic, foam board material. The plastic mold of the invention comprises male and female mold elements, each having a back surface and each having a facing surface about a particular, contoured surface, which interior facing surface forms and defines the mold cavity, when the male and female mold elements are placed in a closed mold position. The mold cavity defines, between the male and female contours, the cavity of defined shape for the object to be molded. The molds of the invention are particularly useful for the preparation of molded objects, through the use of reacting chemicals inserted into the mold cavity, and particularly reacting chemicals which react or cure in situ or expand to form a foamed material, such as, for example, for preparing molded objects of elastomeric polyurethane material, either foamed or solid.

The mold elements, which make up the foam plastic molds of the invention, are composed of a thick, rigid, thermoplastic plank or foam-type material, wherein the interior facing surface of the contours forming the mold cavity has a thin, smooth, solid layer composed of a plastic material.

In one embodiment, the thin, solid layer is integrally formed of the thermoplastic material of the foam material during the formation of the mold cavity, by the melting and subsequent cooling of the melted thermoplastic material, to form the solid-mold facing surface. In this embodiment, the layer is of the same, but solid, material and is integrally bonded with and to the rigid-foam mold material.

In another embodiment, the solid layer may comprise the same or a different plastic, typically a thermoplastic sheet material, as a mold liner or insert, with the insert material separately formed, such as by a thermo, vacuum or other forming method, to the same shape and dimensions of the facing surface of the foam mold, and then inserted into a rough mold cavity as a thin, solid liner. The insert material may be retained in position in the mold by adhesives, by thermobonding to the rigid-foam material of the foam mold, or by other securing means, or may be a close-fitting, easily removable, insert liner which conforms to the mold surface, either directly onto the foam material or over the thin, solid layer of the first embodiment. For example, the insert layer may be composed of a thermoplastic or heat-moldable material, such as a fluorocarbon like Teflon, a polyolefin like a polypropylene, polyethylene or other resin, or particularly a polymeric material to which the polymeric material to be used in the mold does not adhere, to make for easy removal of the molded object from the resulting mold cavity.

In a further embodiment, the foam mold of the invention may use a performed, solid, thermoplastic layer material which is thermoformed or pressure-formed in the process of thermoforming or pressure-forming the mold facing surface or cavity of the foam mold, such as by inserting a thin, solid, sheet layer of the insert sheet material between the rigid-foam plank material and the heated forming die. Regardless of how prepared, the foam molds of the invention include a rigid, thermoplastic foam body having at least one solid, thin, facing layer of the same or different, removable or bonded plastic material. The thin, solid layer may vary in thickness and composition, but generally ranges from about 1/32 to ½ of an inch in thickness; for example, 1/16 to ¼ of an inch, and usually is of a thermoplastic material which can be formed easily, but which has a relatively high melting or softening point; that is, at least 50° F.; for example, 100° F., over the temperature expected in the molding reaction; for example, materials such as polystyrene resin, olefinic resin, or even a metal material of greater melting point, such as 250° F. and, for example, greater than 300° F. to 350° F.

In addition, the plastic mold elements may also include a plastic, supporting, integral or bonded solid layer of a plastic material, typically a thermoplastic material, on the back surface of the mold, typically a flat, solid, sheet, back surface. The solid layer on the back surface may be formed by melting a portion of the back surface of the thermoplastic foam mold and then cooling the melted thermoplastic material, so that the back surface forms a rigid support for the handling and using of the mold elements. In another embodiment, a relatively thick solid of any sheet material may be bonded or otherwise secured to the back surface of the rigid foam mold, to provide a support surface. The back support surface may be strengthened by the incorporation therein of a scrim material or fibers, such as glass fibers. Further, the formation of the solid layer on the back surface of the mold elements is typically carried out in preparing the mold elements, to correct any bowing in the thermoplastic plank material which may occur during the forming operation of the contoured facing surface of each mold. Therefore, the operation of in situ forming of the solid back layer from the rigid foam material is usually carried out after the formation of the contoured mold facing surface.

It is often desirable to form the solid back surface of the male and female mold elements, when the male and female mold elements are placed in a closed mold position, so that both melting of the back surface of the male and female, rigid-foam mold elements and subsequent cooling take place in the same operation, while any bowing or distorting of the male and female elements, caused during the initial and separate forming of the mold elements, is corrected.

The rigid, thermoplastic foam materials suitable for use in preparing the plastic molds and mold elements of the invention comprise a rigid, thermoplastic material; that is, one subject to change in form by heat, and typically would comprise an olefinic resin-type material, such as, for example, polyethylene, polypropylene or copolymers thereof. The ethylene and propylene resin thermoplastic material is particularly suitable for use, in that such material often permits polyurethane and other plastic objects to be stripped from the mold cavity, without the requirement or need for the use of mold-release agents. The ethylene and propylene resin materials in relatively thick, plank form; for example, 1 to 6 inches, are useful thermoplastic foam materials. The thermoplastic foam material may vary in density, but typically would comprise material of 2 to 25 pounds or greater pounds per cubic foot (pcf) density; for example, such as rigid, insulating-type board material used in the construction industry, of from about 4 to 15 pcf, such as 8 to 12 pcf. The thermoplastic foam material should have a high melting point, such as, for example, a melting point greater than 200° F., and more particularly greater than 250° F. or over 300° F.

The plastic male and female mold elements have a contoured facing surface formed by pressing a heated, metal mold or die element into the surface of the thermoplastic foam material, such as, for example, a heated aluminum or epoxy-resin-forming die element, which contains the reverse of the mold cavity or contoured form which is desired in the foam mold material. Generally, the metal-forming element is heated to a temperature sufficient to provide for the rapid formation of the contoured interior facing surface and to have sufficient heat capacity at a temperature sufficient to melt a sufficient portion of the thermoplastic foam, to form an integral, solid layer of the thermoplastic material over the facing surface. The die element is contacted with the flat facing surface of the rigid, board, thermoplastic stock generally with low pressure, which is sufficient pressure to force the heated forming element to the desired depth and for sufficient time, to form the contoured surface and the thin, solid facing surface. The amount of pressure and/or heat to employ varies, depending on the mold material, density, form and mold application. In certain applications, the pressure used may comprise the weight of the die element; for example, as low as 4 to 10 pounds, where an 8-to-10 pcf, rigid-foam plank is used, while other applications might require a much higher pressure; for example, 100 to 400 psi or higher. It has been found that the amount of die prressure used affects the foam surface, since the pressure tends to densify the foam material. Optionally, it is desirable to employ a high-temperature release agent on the contoured, forming surface of the die element, to enhance and aid in the rapid release of the die element from the rigid-foam material.

In the embodiment wherein the rigid-foam molds of the invention are formed by heated die elements, it is important that, after formation of the desired mold cavity by melting of the thermoplastic foam, the die element and mold be cooled or chilled quickly, to stop the further melting process of the foam material and to form the thin, solid, facing layer. Also importantly, the pressure of the die element must be maintained at all times and during the cooling process, in order to prevent the continued melting of the foam material and the withdrawal of the melted foam material from and away from the heated surface of the die element. The die pressure should be maintained during cooling, until the melted thermoplastic material has solidified to form the solid facing layer. On cooling and solidification of the solid facing layer, then the die element can be removed from the mold, without damage to the mold cavity, by adhesion of the melted thermoplastic material to the die-element surface. Therefore, the die-element pressure on the foam material should be continuous and be maintained, while the die element and mold are cooled below the solidification point of the melted thermoplastic material.

The die element and mold material may be cooled, for example, by contacting, such as by immersing, the die element and mold directly into a bath of cold water or by other cooling means. For example, the die element may be provided with coils, so that the die element may be heated by the circulation of hot water and the die element and melted mold surface chilled by the subsequent circulation of cooling water. The cooling step should occur quite rapidly for the best results, since slow cooling is not entirely practical, as the foam material continues to melt. Rapid cooling of the die element and mold should occur within, for example, 5 minutes, and typically less than 1 minute.

After such forming of the male and female elements, the back sides of the foam mold elements are heated, typically between flat, heated, press platens, in order to melt the back surface and to form a relatively thick layer of the solid, thermoplastic material of the foam mold. Such a solid, thick layer is made sufficiently thick; for example, ⅛ to ½ of an inch or more, to provide adequate support for the plastic, foam, mold elements during handling and in use. If desired, a screen or grid-like or other supporting material may be placed on the back surface and incorporated integrally into the solid layer on the back surface, to provide additional support, such as, for example, a fiberglass, mesh, grid-type material. The solid back support surface is rapidly chilled after melting, to form the solid layer of desired thickness and strength, as with the formation of the solid facing layer of the mold cavity.

In one embodiment, the male and female elements may be placed in a closed mold position, and the back surface of each generally simultaneously heated and then cooled to form the integral, solid, back, support surface layer. In such operation, it is often desired to use a somewhat higher pressure than employed in forming the mold cavity in the contoured surfaces of the mold element, particularly where the male and female elements are in a closed mold position, in order to correct any bowing or other distortions caused in the individual mold elements during the contoured molding process.

Thus, the mold in a closed position is often placed between two flat platens which are heated, and a sufficient, constant pressure is employed to place the mold in a close, contacting, molding relationship, to straighten out any distortion, such as bowing, of the individual elements and to form the relatively thick, solid, backing layer. Distortion of the mold element may occur, when the die-element pressure is high or is applied too rapidly to the foam material.

The closed mold is usually left between the closed platens for rapid cooling and then removed. After heating, the platens and mold elements may be cooled rapidly by immersion in cold water, or by removal of the mold elements and then placing a chilled aluminum block against the back surfaces and maintaining the chilled block under pressure in contact, until the solid back surface is cooled. If desired, the platens may be equipped with heating and cooling coils, so that rapid heating and cooling of the back surface of the mold elements, either individually or together and while under pressure, may be accomplished. Excess pressure of the platens on the mold elements should be avoided, and sufficient heat and pressure should be used, to form a level, solid back surface on the mold elements. If desired, the mold cavity may contain sprue opening, particularly where a plastic molding material, such as an elastomeric urethane, is to be injected under pressure into the closed mold in a reaction injection-molding operation.

The inexpensive plastic foam molds of the invention have found particular utility in the preparation of elastomeric foam, polyurethane heel and arch sections for use in preparing a shoe-innersole-type material. In such operation, premixed elastomeric urethane components are placed in the female mold cavity in the open molding technique, and the sheet material is then inserted, to which the elastomeric urethane is to be secured, and the mold elements then closed, or the material placed in the mold, the mold closed and the polyurethane material premixed and injected directly into the mold cavity of the closed mold. The rigid foam molds of the invention are inexpensive and easily prepared, particularly for the molding of low-temperature, urethane or other resin materials.

The invention will be described for the purpose of illustration only in connection with particular embodiments, such as the preparation of molds employed for the molding of heel and arch sections of a shoe innersole; however, it is recognized that various changes, improvements, additions and modifications to the molds of the invention and the method of preparing the molds may be made by those persons skilled in the art, all of which changes, improvements, additions and modifications fall within the spirit and scope of the invention.

BRIEF DESCRIPTION OF THE DRAWINGS

FIGS. 1–5 are schematic illustrations of a method of preparing the rigid-foam molds of the invention;

FIGS. 6A. and B. are illustrative, schematic, perspective views, respectively, of the male and female molds of the invention;

DESCRIPTION OF THE EMBODIMENTS

Figure 7:
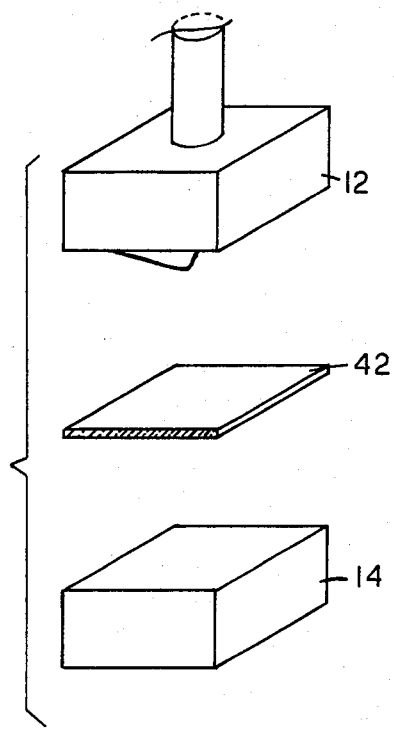
FIG. 7 is a schematic illustration of an alternative method of preparing rigid-foam molds of the invention.

FIG. 1 shows a heated, aluminum, contour-forming die element 12 in a press-type arrangement, having a contoured die surface directly above a rigid polyethylene foam plank material 14. The polyethylene material is softened at a temperature of about 180° F. and melts at a temperature of about 250° F. The heated aluminum die element 12 has a heated surface which is the reverse of the contour of the mold face desired. The die 12 is heated to a temperature of about 450° F. to 525° F. and is pressed lightly and with uniform pressure into the top surface of the foam material 14, to melt the polyethylene foam material 14. Just prior to the full formation of the desired depth of the female mold cavity, the die element 12 and the foam block material 14 are immersed into a bath of cold water, to solidify the melted layer of foam material 14 formed by the heated die element 12 and to form the female mold element of FIG. 3.

FIG. 2 shows the preparation of the corresponding male mold element of the invention shown in FIG. 4, wherein the heated aluminum die element 16 is shown with the rigid, polyethylene, foam plank material 18 therebeneath. The preparation of the male mold element is carried out in a similar manner as the female mold, in that the heated die element 16 is pressed into the top surface of the foam material 18, to melt under pressure the rigid-foam material 18 and, on rapid cooling, to form the reverse of the die-element contoured face.

FIG. 3 shows the female foam mold element 20 of the invention which comprises a thermoplastic, closed-cell, foam material 14, forming the body of the mold, and a pair of mold cavities 24 defining, for the purpose of illustration, a heel and arch section and having a thin, smooth, solid facing surface 22 of the solid thermoplastic polyethylene material formed during the operation of FIG. 1 and integrally bonded to the foam material 14.

FIG. 4 shows the male foam mold element 30, after the operation of FIG. 2, which male element comprises the thermoplastic foam body 18, contoured male surface projections 28 and a thin, smooth, solid facing surface 26 of the solid, thermoplastic polyethylene material formed during the operation of FIG. 1 and integrally bonded to the foam material 14.

FIG. 5 shows the male 30 and the female 20 foam mold elements in a closed mold position, and also shows a sprue opening 32 between the mold elements 20 and 30 disposed between flat, parallel, surface, metal platens 34 and 36, having heating and cooling coils therein. In operation, the platens 34 and 36 are heated and pressed continuously on either side of the back surfaces of the male and female elements 20 and 30, to melt the back surface of the foam material and to force the mold elements into a close relationship and to remove any mold distortions. The elements 20 and 30 are left in-between the retaining platens 34 and 36 and are cooled, while maintained under pressure, and then the platens are released and the molds 20 and 30 removed. The platens 34 and 36 are typically heated to about 300° F. to 500° F., and a continuous pressure of about 100 to 300 psi is used. The mold elements 20 and 30 recovered have flat, level, solid, support back surfaces.

FIGS. 6A. and B. show the male 30 and the female 20 mold elements after the operation of FIG. 5, with solid, relatively thick, flat, support layers 40 and 38 of the polyethylene material integrally bonded to and forming the back surface of the molds 20 and 30. In use, the female 20 and male 30 mold elements are placed in a closed mold position, and expandable, reactable, elastomeric urethane material is premixed and injected into sprue opening 32 and into the mold cavity defined by the solid facing surfaces 24 and 28, to prepare heel and arch sections as shown. Defined by the mold cavity, the elastomeric urethane, after expanding and at least being partially cured, is easily removed from the mold cavity, since it does not adhere to the smooth, polyethylene facing surfaces 26 and 24, although, if desired, a release agent may be used.

FIG. 7 is a schematic illustration of an alternative method of mold preparation, employing the heated die element 12 and the rigid, closed-cell, polyethylene, plank foam material 14, wherein a thin sheet material of a thermoplastic material 42, such as polypropylene, is inserted between the face of the die element 12 and the foam material 14. In operation, the heated face of the die element 12 is pressed into the sheet material 42 and, with the sheet material, into the top surface of the foam material 14, to heat-form the sheet material 42 to the face of the die element 12 and to force the formed and contoured, heated, sheet material 42 into the foam material 14. Depending on the amount of heat and pressure used, the rigid foam material 12, optionally and usually, develops and forms a thin, solid, facing surface layer of the polyethylene material, as well as the controlled-thickness layer of the thermoformed, polypropylene resin material 42. The die element 12 and the mold are rapidly cooled, and the die element is then withdrawn.

Figure 8:
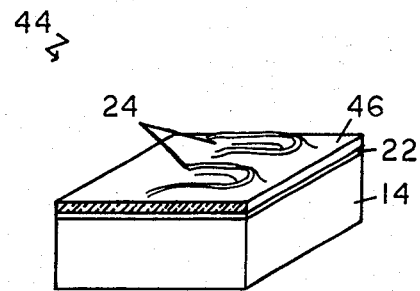
FIG. 8 is a perspective, illustrative view of the rigid-foam mold prepared in FIG. 7.

FIG. 8 is a perspective view of the female foam mold prepared by the operation of FIG. 7, wherein the female mold element 44 comprises a rigid foam body 14, with a thin, solid, smooth, facing layer 22 defining the female mold facing cavity and a contoured polypropylene, thermoformed, solid, smooth layer 46 formed of sheet material 42, which layer 46 is bonded to the solid layer 22 and forms the interior facing surface of the female mold.

Figure 9:
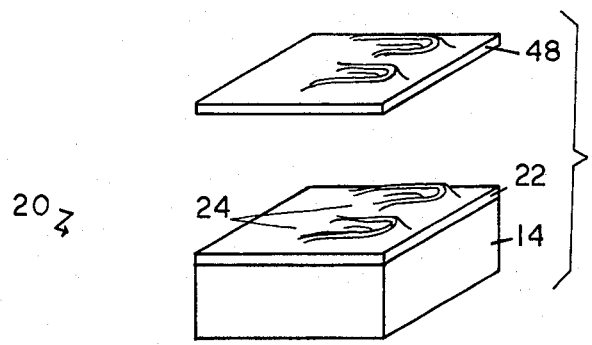
FIG. 9 is a schematic, perspective illustration of another method of preparing a rigid-foam mold of the invention, using a plastic insert in the mold cavity.

FIG. 9 is a perspective, schematic view of a female form mold of FIG. 3 prepared as in FIG. 1, wherein a preformed, contoured, insert liner 48 of polypropylene resin is shown above the mold 20 and is adapted to be inserted as an insert liner on the facing layer 22. In this embodiment, the preformed, insert liner 48 is not bonded to the facing layer 22, and is easily removed from the mold surface, after the molding process, with the molded object. The molded object then may be stripped easily from the insert liner 48 directly after removal or after a time period, to complete the molding cure, without the need to use the rigid foam mold.

The invention provides for cost-effective, inexpensive, easily prepared, rigid-foam, plastic mold elements and a method of preparing and using the mold elements.

What is claimed is:

1. A method for the preparation of a rigid composite thermoplastic foam mold element of a multi-part mold comprising male and female mold elements, each mold element having a thermoplastic rigid foam body, a back surface, and a solid interior mold facing surface contoured so as to form in a closed mold position a mold cavity to prepare a defined object by a molding process, which method comprises:
    (a) contacting under substantially continuous pressure with a heated die element one surface of a first rigid thermoplastic foam material to melt and deform the contacted foam portion of the rigid thermoplastic foam material; and
    (b) rapidly chilling the die element while maintaining the die element in substantially continuous contact with the thermoplastic foam material to form a thin, solid skin layer of the cooled thermoplastic foam material as a mold facing surface, which solid skin layer is integrally bonded to the underlying body of the rigid thermoplastic foam material,
    thereby providing either a male or female mold element of a multi-part mold.

2. The method of claim 1 wherein the rigid thermoplastic foam material comprises a polyethylene or polypropylene foam resin material.

3. The method of claim 1 wherein the thermoplastic rigid foam material has a foam density of from about 2 to 25 pounds per cubic foot.

4. The method of claim 1 which includes heating the back surface of the mold element to melt the thermoplastic foam material on the back surface and cooling the melted thermoplastic material of the back surface to form a solid, integrally bonded support layer of the thermoplastic material on the back surface.

5. The method of claim 1 which includes securing a solid thermoplastic sheet material to the back surface of the mold element to form a solid support layer on the back surface.

6. The method of claim 1 which includes:
    (a) inserting a thin, solid thermoplastic sheet material between the heated die element and the surface of the rigid thermoplastic foam material;
    (b) thermoforming the thin, solid thermoplastic sheet material with the heated die element and pressing the thermoformed thin, solid sheet material with the die element into contact with the surface of the rigid thermoplastic foam material to melt and deform the underlying portion of the rigid thermoplastic foam material; and
    (c) rapidly chilling the die element while maintaining the heated die element in substantially continuous contact with the thin, solid thermoformed sheet material and the rigid thermoplastic sheet material to form a thin, solid layer of the melted thermoplastic foam material integrally bonded to one surface of the thermoformed thin, solid sheet material with the other surface of the thin, solid sheet material forming a facing surface of the mold element.

7. The method of claim 6 wherein the thin, solid sheet material comprises a fluorocarbon resin or an olefinic resin, and the thermoplastic rigid foam material comprises an olefinic foam resin.

8. The method of claim 1 which includes placing a removable, thin, preformed, solid insert liner contoured to fit onto the facing surface of the mold element onto the facing surface of the mold element, the insert liner adapted to be removed from the facing surface after use of the mold element in a molding operation.

9. The method of claim 1 which includes:
    (a) preparing rigid composite thermoplastic foam male and female mold elements as prepared in claim 1;
    (b) placing the male and female mold elements in a mating closed mold position;
    (c) heating the back surface of the mated closed male and female mold elements while under pressure between heated platens to melt a portion of the back surfaces of the male and female mold elements to correct any bowing distortions in the mated mold elements; and (d) cooling the melted back surface of the male and female mold elements while maintaining the mold elements between the platens to form a solid back support layer of the melted thermoplastic foam material integrally bonded to the thermoplastic foam of the body of the mold elements on the back surface.

10. The method of claim 9 which includes placing a scrim-like mesh material onto the back surface of the male or female mold elements to embed the scrim-like mesh material into the solid cool back supporting layer of the mold elements to provide improved mold strength.

11. The method of claim 1 which includes rapidly chilling the die element by imersing the die element and the rigid foam thermoplastic material in a cool water bath.

12. The method of claim 1 which includes rapidly chilling the die element by circulating cooling water through the die element.

13. The rigid thermoplastic foam mold element prepared by the process of claim 1.

14. A method for the preparation of rigid composite polyolefin foam mold elements of a multi-part mold comprising male and female mold elements, each mold element having a rigid composite thermoplastic foam body, a back surface, and an interior mold facing surface contoured so as to form in a closed mold position a mold cavity to prepare a defined object by a molding process, which method comprises:
  (a) contacting under substantially continuous pressure with a heated die element one surface of a first rigid olefinic thermoplastic foam material to melt and deform the contacted foam portion of the rigid olefinic thermoplastic foam material; and
  (b) rapidly chilling the die element while maintaining the die element in substantially continuous contact with the olefinic thermoplastic foam material to form a thin, solid skin layer of the cooled olefinic thermoplastic foam material as a mold facing surface, which solid skin layer is integrally bonded to the underlying body of the rigid olefinic thermoplastic foam material thereby providing a male or female mold element;
  (c) repeating steps (a) and (b) with a second thermoplastic olefinic foam material to form a second mating mold element;
  (d) placing the male and female mold elements as prepared in a closed mold position and heating the male and female mold elements under pressure between heated platens, the back surfaces of the male and female mold elements heated to a temperature and for a time sufficient to melt a portion of the back surface of the male and female mold elements; and
  (e) and cooling the back surfaces of said male and female elements while under pressure between the platens to provide for correction of any bowing distortions in the male and female mold elements and to provide a relatively thick, solid, integrally bonded support layer of the solid thermoplastic cooled material on the back surface of the male and female mold elements.

15. A multi-part rigid composite foamed olefinic mold formed of the male and female mold elements as prepared in claim 14.

16. The method of claim 14 wherein the olefinic thermoplastic foam material comprises a polyethylene or polypropylene having a foam density of from about 4 to 25 pounds per cubic foot.

17. The method for the preparation of a rigid composite thermoplastic foam mold element of a multi-part mold comprising male and female mold elements, each mold element having a thermoplastic rigid foam body, a back surface, and an interior mold facing surface contoured to form in a closed mold position a mold cavity to prepare a defined object by a molding process, which method comprises:
  (a) inserting between the surface of a heated die element and the surface of a rigid thermoplastic foam material a thin, solid, thermoplastic sheet material;
  (b) contacting one surface of the solid, thin, thermoplastic sheet material with the heated die element to thermoform the thin thermoplastic sheet material;
  (c) contacting under substantially continuously pressure one surface of the rigid thermoplastic foam material with the thermoformed thin thermoplastic material with the heated die element on the opposite side of the thermoformed material to melt and deform a portion of the foam of the rigid thermoplastic foam material in contact thermoformed material; and
  (d) rapidly chilling the die element while maintaining the die element in substantially continuous contact with the one side of the thermoformed thin thermoplastic sheet material to integrally bond one surface of the cooled thermoformed sheet material to the underlying body of the rigid thermoplastic foam material and to form a solid thermoformed skin layer as a facing surface of the mold element.

18. The method of claim 17 wherein the thermoplastic foam material comprises a olefinic foam resin material and the thin thermoplastic sheet material comprises a fluorocarbon resin or an olefinic resin.

19. The method of claim 17 which includes:
  (a) forming a rigid thermoplastic foam male and female mold elements as prepared in claim 17;
  (b) placing the male and female mold elements in a mating closed mold position;
  (c) heating the back surface of the mated male and female mold elements under pressure to melt a portion of the back surfaces of the male and female mold elements while under pressure and to correct bowing distortions in the mated mold elements; and
  (d) cooling the melted back surface of the male and female mold elements while maintaining the mold elements under pressure to form a solid back support layer of the cool thermoplastic foam material integrally bonded to the thermoplastic foam material of the body of the mold elements.

20. A multi-part rigid composite foamed thermoplastic mold, which multi-part mold comprises a male and a female mold element adapted to be placed in a closed mating position to define a mold cavity therebetween for the molding of an object, each mold element having a body of rigid thermoplastic foam material and a bonded, solid back support layer, and an integrally bonded, solid thermoplastic skin layer, which skin layer forms the mold facing surface of the male and female mold elements.

21. The mold of the claim 20 wherein the thermoplastic foam material comprises an olefinic thermoplastic foam material having a density of from about 2 to 25 pounds per cubic foot.

22. The mold of claim 20 wherein the integrally bonded solid skin layer as the facing surface is derived from the melting and cooling of the thermoplastic foam material.

23. The mold of claim 20 which includes a thin, solid thermoplastic facing layer composed of a thermoplastic material integrally bonded to the thermoplastic skin layer and which thermoplastic material is a different material than the thermoplastic foam material of the mold element.

24. The mold of claim 20 which includes a thin, removable, thermoplastic insert liner sheet material which matingly fits onto the facing surface of the male or female mold elements to define a new facing surface composed of the insert liner material.

25. The mold of claim 20 wherein the back support layer comprises a solid thermoplastic material derived from the melting and cooling of the thermoplastic foam material.

26. The mold of claim 20 wherein the thermoplastic foam material comprises a closed-cell, rigid polyethylene foam board stock material and the facing surface comprises a solid polypropylene resin layer.

27. The mold of claim 20 which includes a scrim-like mesh material embedded in the solid supporting layer of the back surface.

28. The mold of claim 20 wherein the mold cavity defines a section of a shoe innersole and which mold is suitable for use in molding of elastomeric urethane foam material wherein the expansion and reaction of the urethane foam material occurs within the mold cavity.

29. A multi-part rigid composite foamed thermoplastic mold, which multi-part mold comprises a male and female mold element adapted to be placed in a closed mold position to define a mold cavity therebetween for the molding of a object, each of the male and female mold elements having a body composed of a rigid, olefinic thermoplastic foam material having a foam density of from about 4 to 25 pounds per cubic foot and an integrally bonded, solid back support layer derived from the melting and cooling of the thermoplastic foam layer and an integrally bonded, solid, thin skin layer which forms the mold facing surfaces of the male and female mold elements, which skin layer has been derived from the melting and cooling of the thermoplastic foam material.

* * * * *